US012803167B2

(12) United States Patent
Ra'di et al.

(10) Patent No.: US 12,803,167 B2
(45) Date of Patent: Nov. 17, 2026

(54) DISPERSION ENGINEERED LOAD TO EXTEND THE BANDWIDTH OF ELECTRICALLY SMALL ANTENNAS

(71) Applicant: Research Foundation of the City University of New York, New York, NY (US)

(72) Inventors: Younes Ra'di, New York, NY (US); Ahmed Mekawy, Fort Lee, NJ (US); Andrea Alù, Tenafly, NJ (US)

(73) Assignee: RESEARCH FOUNDATION OF THE CITY UNIVERSITY OF NEW YORK, New York, NY (US)

( * ) Notice: Subject to any disclaimer, the term of this patent is extended or adjusted under 35 U.S.C. 154(b) by 56 days.

(21) Appl. No.: 18/833,120

(22) PCT Filed: Apr. 21, 2023

(86) PCT No.: PCT/US2023/019439

§ 371 (c)(1),
(2) Date: Jul. 25, 2024

(87) PCT Pub. No.: WO2024/085918

PCT Pub. Date: Apr. 25, 2024

(65) Prior Publication Data

US 2025/0167447 A1 May 22, 2025

Related U.S. Application Data

(60) Provisional application No. 63/333,696, filed on Apr. 22, 2022.

(51) Int. Cl.
*H01Q 5/335* (2015.01)
*H01Q 7/00* (2006.01)

(52) U.S. Cl.
CPC ............... *H01Q 5/335* (2015.01); *H01Q 7/00* (2013.01)

(58) Field of Classification Search
CPC ................................ H01Q 5/335; H01Q 7/00
See application file for complete search history.

(56) References Cited

U.S. PATENT DOCUMENTS

| | | | | |
|---|---|---|---|---|
| 10,553,952 | B1 * | 2/2020 | Sternowski | H01Q 9/44 |
| 2005/0146402 | A1 | 7/2005 | Sarabandi et al. | |
| 2016/0328584 | A1 * | 11/2016 | Rokhsaz | G06K 7/10326 |
| 2017/0062909 | A1 * | 3/2017 | Alpaslan | H01Q 9/0442 |
| 2018/0076521 | A1 * | 3/2018 | Mehdipour | H01Q 5/335 |
| 2018/0373970 | A1 * | 12/2018 | Seban | G06K 19/07794 |

(Continued)

OTHER PUBLICATIONS

Chu, L.J.; Physical Limitations of Omni-Directional Antennas; J. Appl. Phys. Dec. 1, 1948; pp. 1163-1175; vol. 19; https://doi.org/10.1063/1.1715038.

(Continued)

*Primary Examiner* — Thien M Le
(74) *Attorney, Agent, or Firm* — Schmeiser Olsen, PLLC; Peter J. Mikesell

(57) ABSTRACT

An apparatus comprises an antenna; and a matching circuit comprising at least one electronic circuit element including a dispersive material for tuning the antenna to modify a bandwidth of the antenna. The dispersive material is configured to nullify at least a portion of the stored energy of at least one electronic circuit element from a vantage point of an antenna port of the antenna.

20 Claims, 15 Drawing Sheets

(56) References Cited

U.S. PATENT DOCUMENTS

| | | | | |
|---|---|---|---|---|
| 2019/0379122 | A1* | 12/2019 | Kenkel | H01Q 1/273 |
| 2020/0191988 | A1* | 6/2020 | Ray | G01V 3/101 |
| 2021/0249772 | A1 | 8/2021 | Sazegar et al. | |
| 2023/0028251 | A1* | 1/2023 | Labriola, II | H01Q 9/30 |
| 2024/0006770 | A1* | 1/2024 | Rodríguez | H01Q 1/2283 |
| 2024/0078407 | A1* | 3/2024 | Liu | G06K 19/0779 |

OTHER PUBLICATIONS

Yaghjian, A.; Overcoming the Chu Lower Bound on Antenna Q with Highly Dispersive Lossy Material; 5 pages; 2017 11th European Conference on Antennas and Propagation (EUCAP).

Yaghjian, A.; Internal Energy, Q-Energy, Poynting's Theorem, and the Stress Dyadic in Dispersive Material; IEEE Transactions on Antennas and Propagation; Jun. 2007; pp. 1495-1505; vol. 55, No. 6; DOI: 10.1109/TAP.2007.897350.

Yaghjian, A.; Impedance, Bandwidth, and Q of Antennas; IEEE Transactions on Antennas and Propagation; Apr. 2005; pp. 1298-1324; vol. 53, No. 4.

Yaghjian, A.; Improved Formulas for the Q of Antennas With Highly Lossy Dispersive Materials; IEEE Antennas and Wireless Propagation Letters; 2006; pp. 365-369; vol. 5.

Stuart, H. et al.; Limitations in Relating Quality Factor to Bandwidth in a Double Resonance Small Antenna; IEEE Antennas and Wireless Propagation Letters; 2007; pp. 460-463; vol. 6.

Tretyakov; S.A.; Electromagnetic field energy density in artificial microwave materials with strong dispersion and loss; Physics Letters A; Jun. 14, 2005; pp. 231-237; vol. 343.

Zobel, O.; Theory and Design of Uniform and Composite Electric Wave-filters; The Bell System Technical Journal; 1923; 46 pages; vol. II, No. I.

Karilainen, A. Choosing Dielectric or Magnetic Material to Optimize the Bandwidth of Miniaturized Resonant Antennas; IEEE Transactions on Antennas and Propagation; Nov. 2011; pp. 3991-3998; vol. 59, No. 11.

Ikonen, P. et al.; Magnetodielectric Substrates in Antenna Miniaturization: Potential and Limitations; IEEE Transactions on Antennas and Propagation; Nov. 2006; pp. 3391-3399; vol. 54, No. 11.

ISA/US; International Search Report/Written Opinion issued May 28, 24 in corresponding International Application PCT/US2023/019439 filed Apr. 21, 2023.

* cited by examiner

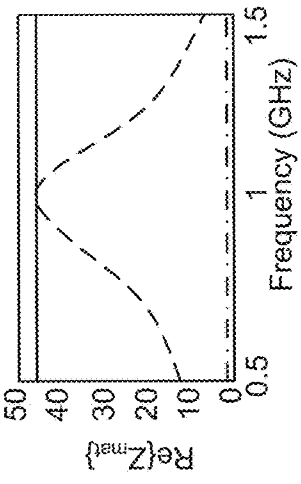
FIG. 4A
- · – NonDis., Lossless
—— NonDis., Lossy
– – – Dis., (Yaghjian)
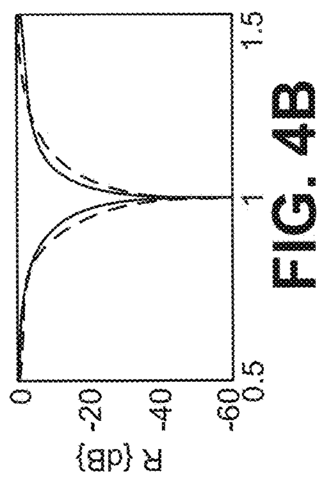
FIG. 4B
$$R = \frac{Z_{Lnp} - Z_0}{Z_{Lnp} + Z_0}$$
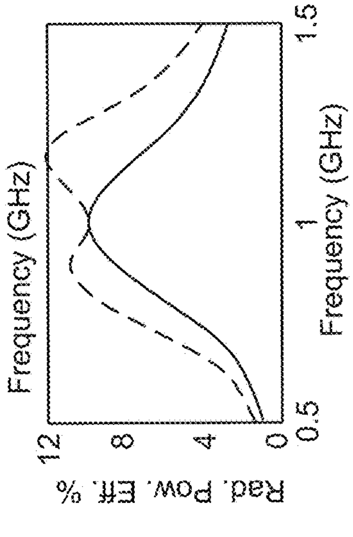
FIG. 4C
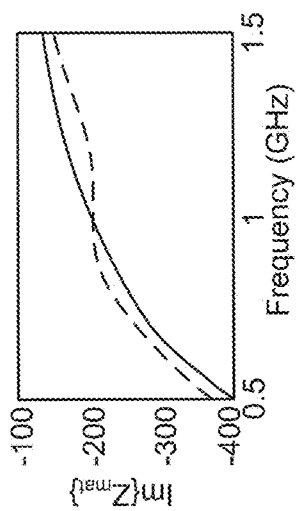
FIG. 4D
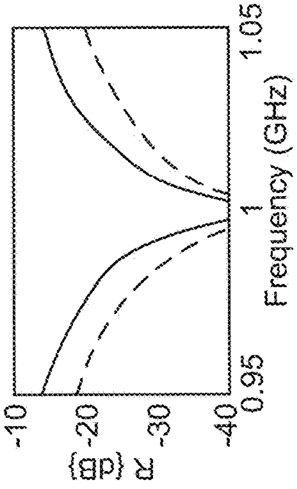
FIG. 4E
$$P_{RadPowEff} = \frac{4R_a Z_0}{\left|Z_0 + Z_{Lnp}\right|^2}$$
FIG. 4F NonDis., Lossless
NonDis., Lossy
Dis., (Yaghjian)
NonDis., No Stored Energy
Dis., Eff. Neg. Inductor

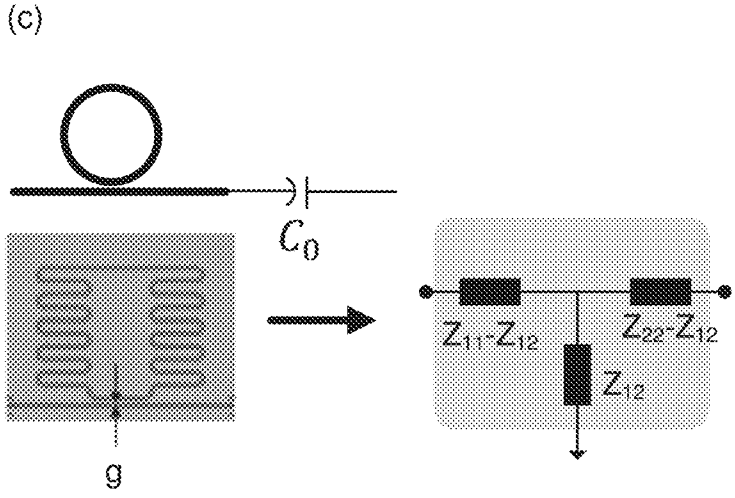
FIG. 20
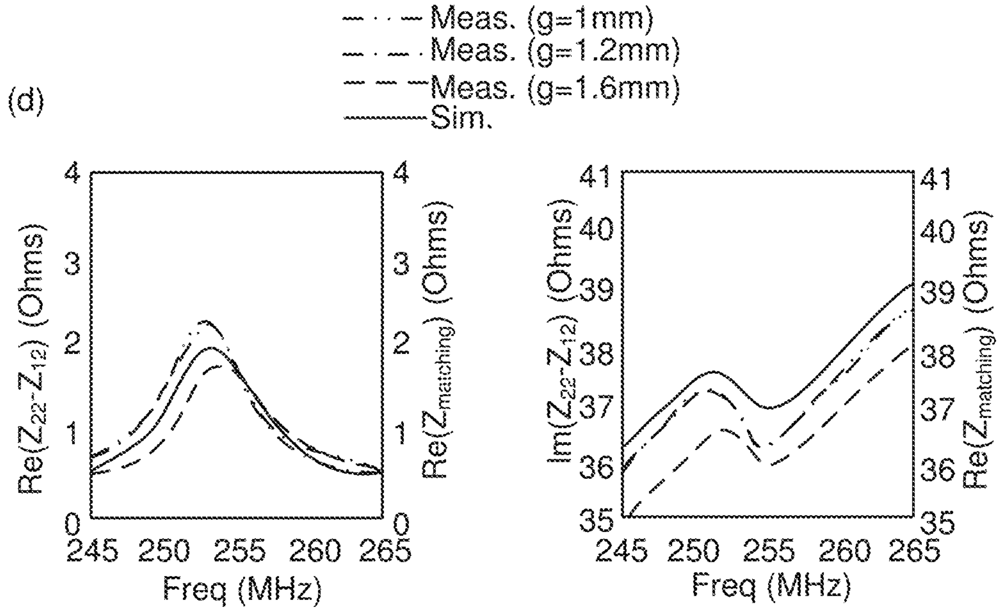
FIG. 21A
FIG. 21B

DISPERSION ENGINEERED LOAD TO EXTEND THE BANDWIDTH OF ELECTRICALLY SMALL ANTENNAS

RELATED APPLICATIONS

This application claims priority to U.S. Provisional Application Ser. No. 63/333,696 filed Apr. 22, 2022, entitled "DISPERSION ENGINEERED LOAD TO EXTEND THE BANDWIDTH OF ELECTRICALLY SMALL ANTENNAS," the entirety of which is incorporated by reference herein.

STATEMENT REGARDING FEDERALLY FUNDED RESEARCH OR DEVELOPMENT

This invention was made with government support under grant number HR00111820040 awarded by the Defense Advanced Research Projects Agency (DARPA) and grant number FA9550-18-1-0379 awarded by the Air Force Office of Scientific Research (AFOSR). The government has certain rights in the invention.

FIELD OF THE INVENTION

The present invention relates generally to electrically small antennas. More particular, the invention relates to matching circuits that extend the bandwidth for electrically small antennas.

BACKGROUND

Electrically small antennas are popular due to their size and low cost, but on the other hand are less efficient. The limits of small antennas are well-known, and efforts have been made to evaluate and improve small antenna improvements. In particular, efforts have been made to enhance the bandwidth of electrically small antennas including the use of conventional impedance matching approaches. However, these approaches require active power-hungry elements, or are severely limited in terms of trade-off with efficiency.

SUMMARY

In one aspect, provided is an apparatus comprising an antenna and a matching circuit comprising at least one electronic circuit element including a dispersive material for tuning the antenna to modify a bandwidth of the antenna. The dispersive material is configured to nullify at least a portion of the stored energy of at least one electronic circuit element from a vantage point of an antenna port of the antenna.

In another aspect, provided is a method of realizing an arbitrary frequency dispersion in the matching load of an antenna by implementing a corresponding circuit configuration: fitting the frequency dispersion into a sum of Lorentzian functions of the $$\text{form } \sum_n \frac{\left(\frac{\omega_{pn}}{\omega_{0n}}\right)^2}{1-\left(\frac{\omega}{\omega_{0n}}\right)^2+j\left(\frac{\gamma_n}{\omega_{0n}}\right)\left(\frac{\omega}{\omega_{0n}}\right)};$$

and implementing for each Lorentzian term in the sum a corresponding circuit load, in which each circuit element follows the parameters of the corresponding Lorentzian resonant frequency and dispersion parameters $\omega_{pn}$, which defines the Lorentzian resonance strength, $\omega_{0n}$, which defines the Lorentzian resonance frequency, and $\gamma_n$, which defines the damping frequency.

In another aspect, provided is an apparatus comprising an antenna and a system that tunes the antenna according to a method comprising: fitting a frequency dispersion into a sum of Lorentzian functions of the form $$\sum_n \frac{\left(\frac{\omega_{pn}}{\omega_{0n}}\right)^2}{1-\left(\frac{\omega}{\omega_{0n}}\right)^2+j\left(\frac{\gamma_n}{\omega_{0n}}\right)\left(\frac{\omega}{\omega_{0n}}\right)};$$

and implementing for each Lorentzian term in the sum a corresponding circuit load, in which each circuit element follows the parameters of the corresponding Lorentzian resonant frequency and dispersion parameters $\omega_{pn}$, which defines the Lorentzian resonance strength, $\omega_{0n}$, which defines the Lorentzian resonance frequency, and $\omega_n$, which defines the damping frequency.

In another aspect, provided is an antenna comprising a matching circuit given by FIG. 7.

In another aspect, provided is an antenna comprising a matching circuit given by FIG. 8.

In another aspect, provided is an antenna comprising a matching circuit given by FIG. 13.

In another aspect, provided is an antenna comprising a matching circuit given by a method of realizing an arbitrary frequency dispersion in the matching load of an antenna by implementing a corresponding circuit configuration:

fitting the frequency dispersion into a sum of Lorentzian functions of the form $$\sum_n \frac{\left(\frac{\omega_{pn}}{\omega_{0n}}\right)^2}{1-\left(\frac{\omega}{\omega_{0n}}\right)^2+j\left(\frac{\gamma_n}{\omega_{0n}}\right)\left(\frac{\omega}{\omega_{0n}}\right)};$$

and implementing for each Lorentzian term in the sum a corresponding circuit load as in the sketches in claim 1, 2 or 3, in which each circuit element follows the parameters of the corresponding Lorentzian $\omega_{pn}$, $\omega_{0n}$, $\gamma_n$.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. In the drawings:

FIGS. 4A-4F are graphs and equations illustrating a comparison between dispersive matching mechanisms of FIG. 2 and nondispersive matching mechanisms of FIGS. 1 and 3.

FIG. 20 is a view of a PCT implementation of the dispersive capacitor of FIG. 18 and an equivalent circuit model.

FIGS. 21A and B are graphs illustrating Z parameters of the matching network from measurements for different gap values.

DETAILED DESCRIPTION

In brief overview, embodiments of the present inventive concept provide especially tailored circuit elements that mimic tailored frequency dispersion in materials. The elements are used to enhance the bandwidth of electrically small inductive or capacitive antennas beyond what is possible using conventional matching approaches without need for active power-hungry elements.

The disclosed circuit addresses the need for broader bandwidth in electrically small antennas. The lower limit on the quality (Q) factor, referred to as the Chu lower bound, on the quality factor of linear, passive, time invariant, one-port dipole antennas characterized by a single resonance has been accepted as a general bound for decades. Naturally, this lower bound for the quality (Q) factor of an antenna, and consequently the maximum achievable bandwidth, can be overcome by adding loss to the antenna, which comes at the cost of efficiency loss. This disclosure provides new approaches to overcome this bandwidth limit on electrically small antennas.

To explain how embodiments of the disclosed concept extend the bandwidth of electrically small antennas, the Q-energy definition can be applied according to equation (1) that describes the effective stored energy in a dispersive lossy system as seen by an electrically small antenna. The Q-energy provides a very good approximation for the quality factor of the antenna and consequently its operational bandwidth:

$$W(\omega)=\frac{1}{4}\int_{V_\infty}\{[E^*\cdot(\omega\bar{\bar{\varepsilon}})'\cdot E+H^*\cdot(\omega\bar{\bar{\mu}})'\cdot H]+ [E^*\cdot(\omega\bar{\bar{\tau}})'\cdot H+H^*\cdot(\omega\bar{\bar{\nu}})'\cdot E]\}dV, \tag{1}$$

$$Q(\omega)=\eta\frac{\omega|W(\omega)|}{P_{rad}(\omega)}\square\frac{\omega|Z'(\omega)|}{2R(\omega)}\square\frac{2\sqrt{\beta}}{FBW_\beta}$$

Figure 1:
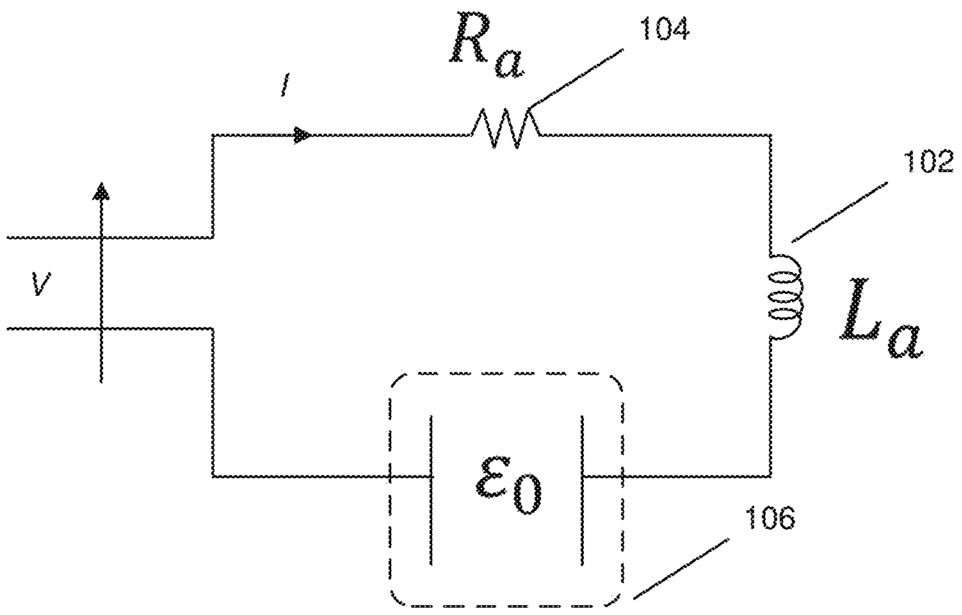
FIG. 1 is a diagram of a circuit for tuning an electrically small antenna using a capacitor filled with air, in which embodiments of the present inventive concept can be practiced.

For example, an electrically small inductive antenna can be modeled using a series connection of an inductor (La) 102 and a resistor (Ra) 104 representing the radiation resistance of the antenna, as shown in FIG. 1. The conventional approach to bring the antenna to resonance is to add a simple capacitor 106 with an appropriate capacitance which will nullify the reactive part of the input impedance at the resonance frequency. However, naturally, a capacitor with a nondispersive air/material having an absolute permittivity ($\epsilon_0$) also adds additional reactive energy into the system, increasing its total value to twice the dominant reactance energy in the system. This results in a factor of 2 in the Chu expression for the Q factor, which consequently, halves the achievable bandwidth in this electrically small antenna:

$$X(\omega_0)=0\rightarrow Q=2\eta\omega\frac{W_0}{P_{rad}}\rightarrow Q_{Chu(\omega)}=\frac{\eta}{(ka)^3} \tag{2}$$

The natural question that comes to mind at this point is that of whether the antenna can be brought to resonance without decreasing the available bandwidth and even potentially increasing it. To address this, Yaghjian ("*Overcoming the Chu lower bound on antenna Q with highly dispersive lossy material.*" IET Microwaves, Antennas & Propagation 12.4 (2018): 459-466), incorporated by reference herein in its entirety, had previously proposed that it may be possible to use a capacitor/inductor 106*a* partially or completely filled with a highly dispersive electric/magnetic material.

Figure 2:
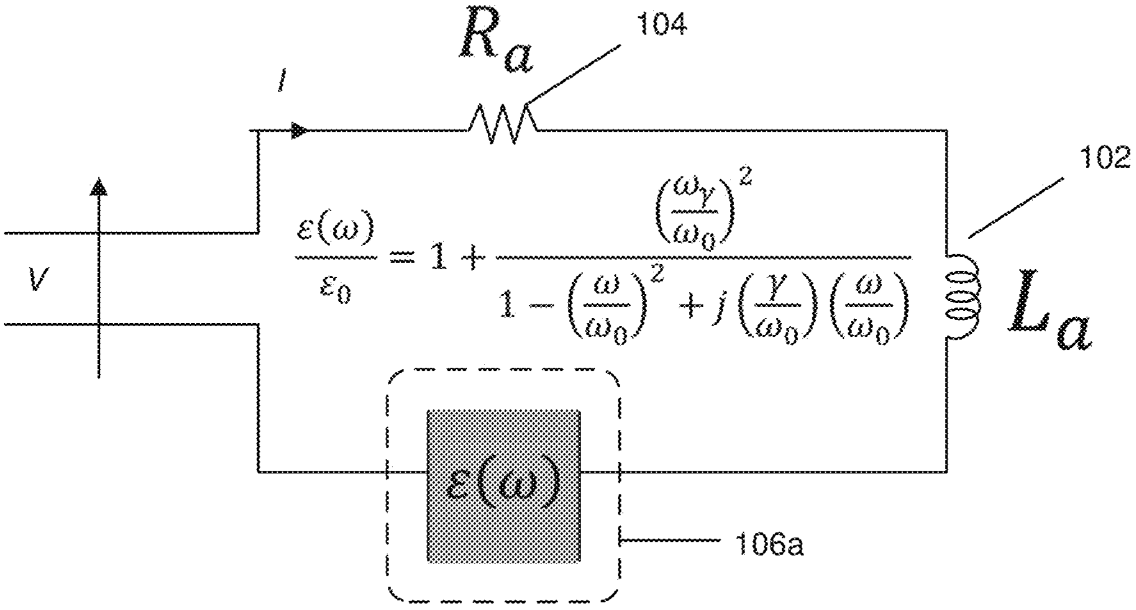
FIG. 2 is a diagram of a circuit for tuning an electrically small antenna using a capacitor filled with a highly dispersive dielectric material, in which embodiments of the present inventive concept can be practiced.

FIG. 2 is a schematic of such a scenario for an electrically small inductive antenna where the tuning capacitor is partially or completely filled with a highly dispersive material with Lorentzian dispersion having a permittivity ($\varepsilon(\omega)$).

The input impedance of the whole circuit shown in FIG. 2 reads $$Z(\omega)=\frac{V(\omega)}{I(\omega)}=R(\omega)-jX(\omega)=R_a-j\omega L_a+\frac{jd}{\omega\varepsilon(\omega)A} \tag{3}$$

where A is the area of the capacitor plates and d is their separation distance. Bringing the whole system to resonance at $\omega=\omega_0$ requires that $$\frac{d\varepsilon_r(\omega)}{A|\omega\varepsilon(\omega)|^2} = L_a.$$

Now using the Q-energy definition given in (1), calculate the Q-energy can be calculated for this system:

$$W(\omega) = \frac{1}{4}\frac{[\omega\varepsilon(\omega)]'}{|\omega\varepsilon(\omega)|^2}\frac{\varepsilon_0}{C_0}|I|^2 + \frac{1}{4}L_a|I|^2 \tag{4}$$

$$\text{where } C_0 = \varepsilon_0\frac{A}{d}.$$

Figure 3:
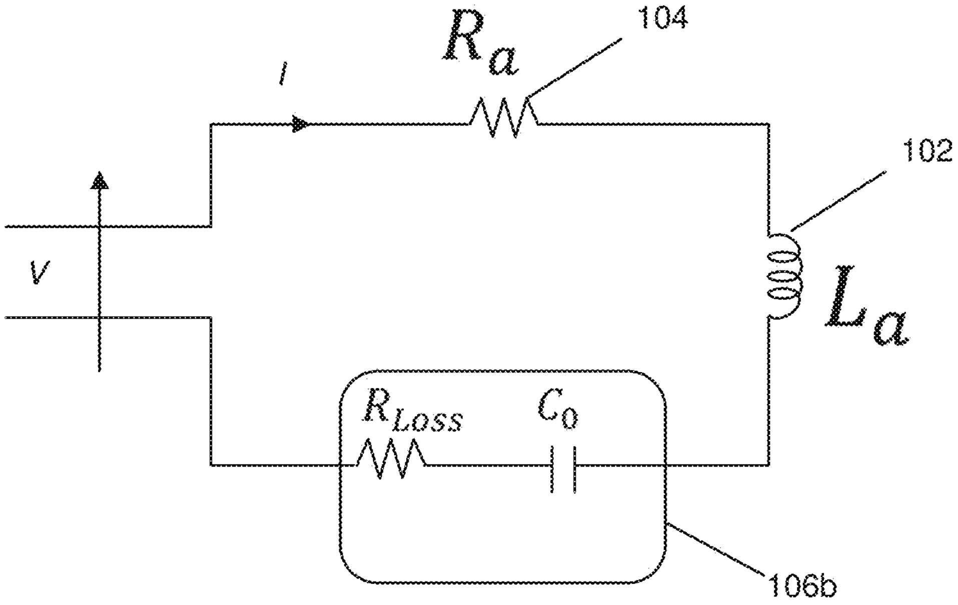
FIG. 3 is a diagram of a circuit tuning an electrically small antenna including a nondispersive matching mechanism for using a capacitor filled with air.

FIG. 3 is a diagram of a circuit tuning an electrically small antenna including a nondispersive matching mechanism for using a capacitor partially or completely filled with air. FIG. 3 may be similar to FIG. 1 except that the simple capacitor 106 of FIG. 1 is replaced with an RC circuit 106*b* including lossy resistor $R_{Loss}$ and capacitor $C_0$.

To prevent the capacitor from adding extra stored energy to the system, one can in principle engineer the dispersion of the material inside the capacitor so as to nullify its contribution to the Q-energy, reducing the overall Q energy, and consequently increasing the bandwidth as can be seen from equation (1). To this end, we need to satisfy $[\omega\varepsilon(\omega)]'=0$ at the resonance frequency which holds if $\gamma=\sqrt{2}\omega_p$ and $$C_0 = \frac{2}{L_a(2\omega_0^2+\omega_p^2)}.$$

To verify the validity of this concept, an example can be provided of an electrically small antenna with $\omega_0=2\pi\times500\times10^6$, $L_a$=63.66 nH, $R_a$=5Ω.

FIGS. 1-4F can illustrate a comparison of two different cases of tuning. For example, FIGS. 3 and 4A-4C illustrate the case of nondispersive matching where a simple capacitor 106, 106*b* (partially or completely filled with air) is used to match the electrically small inductive antenna. FIGS. 2 and 4D-4F illustrate the case where the concept introduced by Yaghjian, incorporated by reference above, is implemented where the antenna is matched with a capacitor 106*a* partially or completely filled with a dispersive material. Note that in the dispersive case, the capacitor 106*a* will introduce additional loss into the system. To have a fair comparison, the same amount of loss is added to the nondispersive case. As shown in FIGS. 4A-4F, the dispersive case broadens the bandwidth of the radiated power twice that of the nondispersive case with the same amount of loss.

Yaghjian, incorporated by reference herein, suggests the use of a hypothetical material with precisely engineered dispersion characteristics. However, this can only be achieved if a material is fabricated the specific dispersion that matches the antenna operation of interest, which in practice would severely limit the applicability of this concept. Embodiments of the present inventive concept can implement the foregoing using suitably tailored complex circuit layouts, so that it is possible to implement an arbitrarily dispersive and lossy capacitor illustrated in FIGS. 1-4F.

Figure 5:
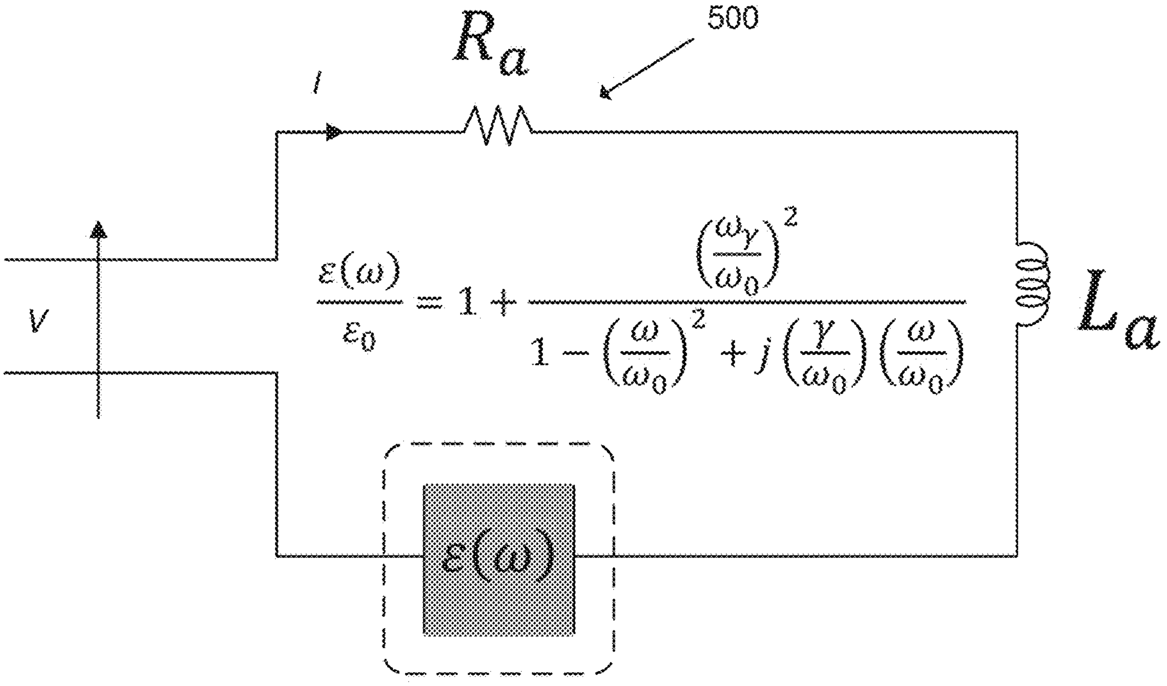
FIGS. 5 and 6 are diagrams of electrically small capacitive antenna circuits, in which embodiments of the present inventive concept can be practiced.
Figure 6:
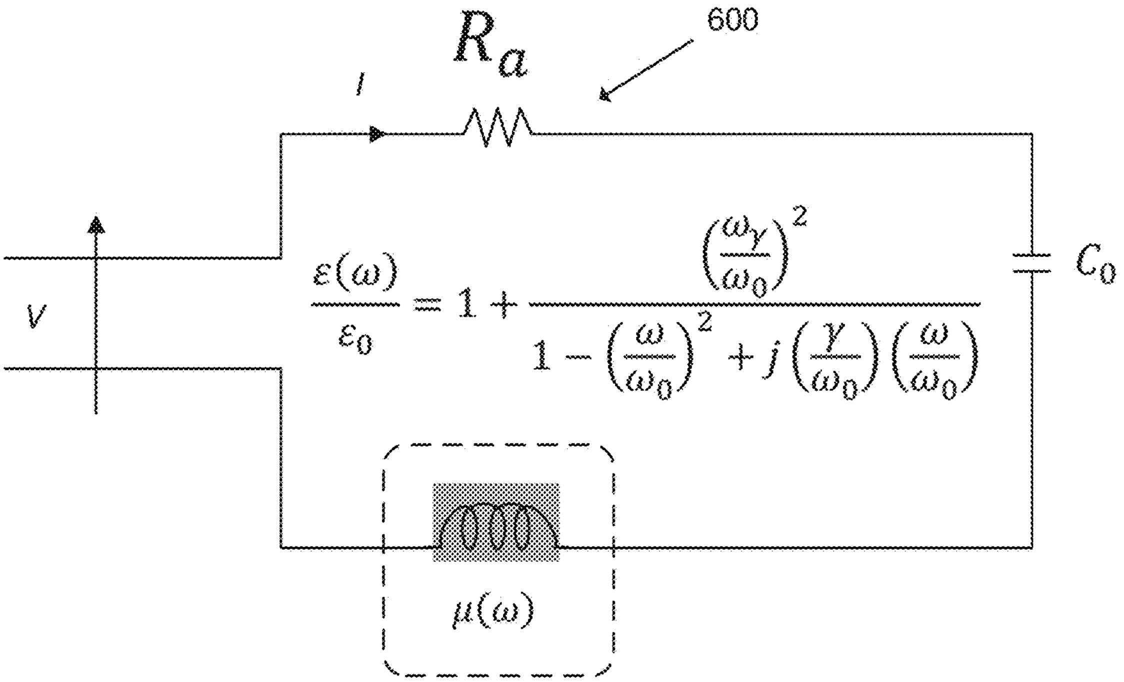
Figure 7:
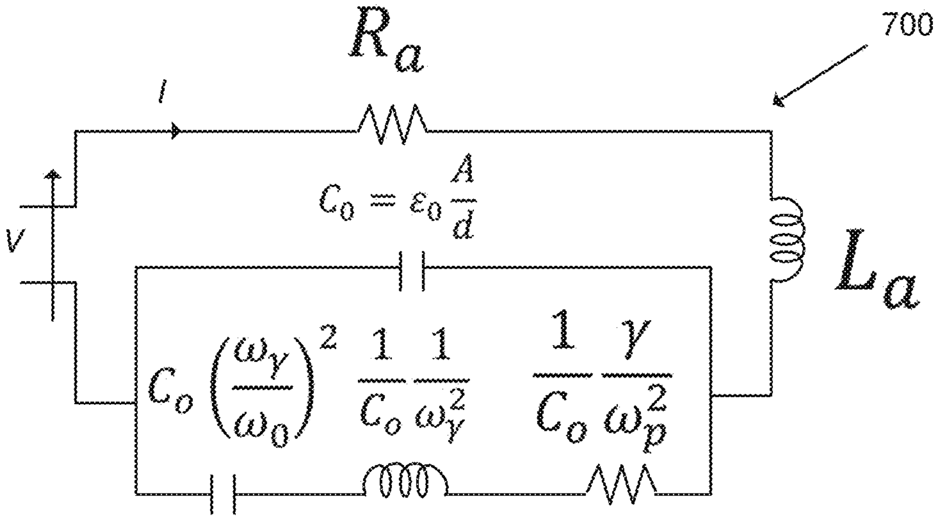
FIGS. 7 and 8 are equivalent circuit models of the circuits of FIGS. 5 and 6, respectively.
Figure 8:
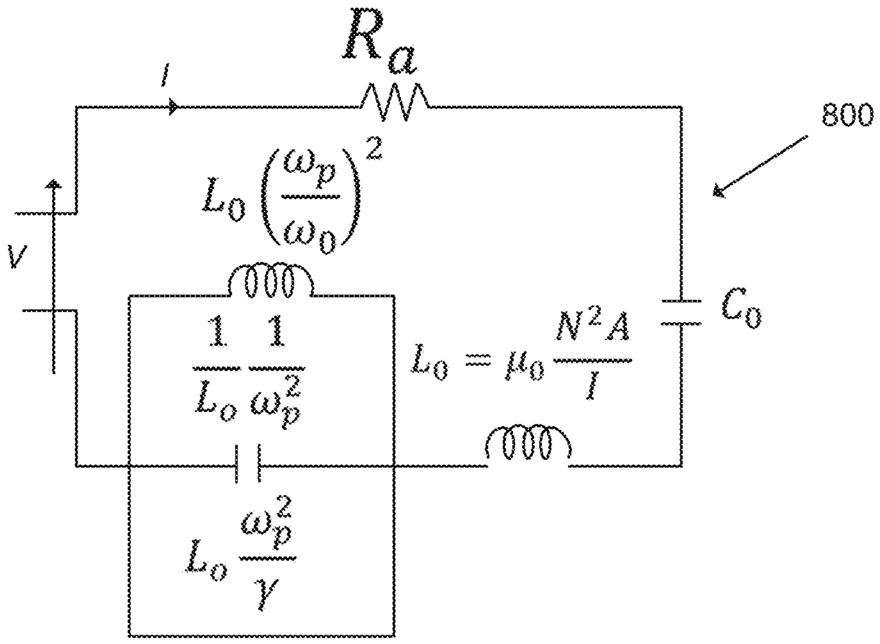

As described above, embodiments of the present inventive concept can be applied to an electrically small inductive antenna. In other embodiments, However, the present inventive concept can be readily applied to electrically small capacitive antennas. FIGS. 5 and 6 illustrate circuit models 500, 600, respectively, for these two different scenarios using ideal dispersive materials that partially or completely fill the corresponding matching capacitor and inductor. In particular, circuit models 500, 600 describe an electrically small inductive antenna tuned with a capacitor partially or completely filled with highly dispersive dielectric. It is desirable for the antenna to be tuned to receive or transmit signals at an adequate range at a minimum of energy losses. FIGS. 7 and 8 illustrate corresponding circuit realizations 700, 800, respectively, that implement the required dispersive loads, in which the properties of the dispersion of the hypothetical material filling the circuit elements are mapped into the circuit elements composing the load. In particular, circuit models 700, 800 describe an electrically small capacitive antenna tuned with an inductor partially or completely filled with highly dispersive magnetic material. The values specified in each figure map the dispersion of an ideal material filling the capacitor with the circuit implementation. The response of our circuit layouts 700, 800 in FIGS. 7 and 8 is identical from the antenna perspective as the idealized dispersive matching elements in FIGS. 5 and 6. All required circuit parameters to map the two problems together are provided herein. Since this approach can map an arbitrary Lorentzian dispersion of a hypothetical material into a practical circuit configuration, and the dispersion of any passive material can be described as a sum of Lorentzian dispersions, this approach can be applied to realize an arbitrarily complex material dispersion in the matching network of an antenna into a practical circuit configuration, stacking in series or parallel circuit blocks, for example, illustrated in FIGS. 7 and 8.

A second feature in accordance with embodiments of the present inventive concept is that it is possible to choose and realize even more dispersive circuit loads that further enhance the bandwidth of the antenna. This can be achieved according to two different approaches. In one embodiment, as shown in the circuit 900C of FIG. 9C, the dispersion of the material is inside the capacitor so that the capacitor effectively operates as a negative inductor around the resonance frequency: $[Z_{mat}(\omega)]'=-L_a\rightarrow[z_{In}, (\omega)]'=0$. This way, the total stored energy is nullified in the system around the design frequency. In adding higher order dispersions, the frequency range can be widened where this condition holds and as a result can widen the overall bandwidth of the antenna even more.

Figure 9A:
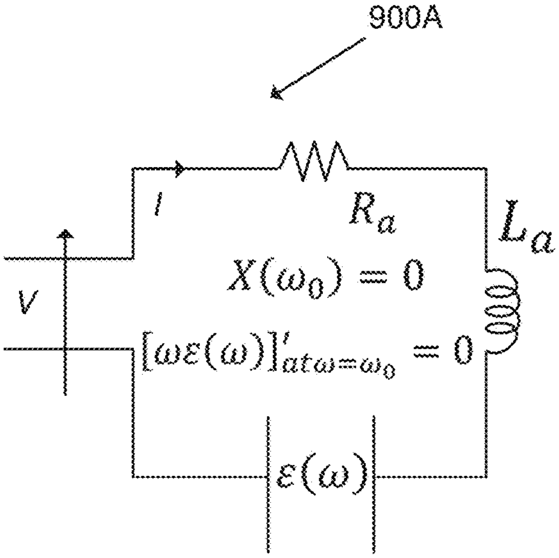
FIGS. 9A-9C are diagrams of a circuit having different dispersive loads in which embodiments of the present inventive concept can be practiced.
Figure 9B:
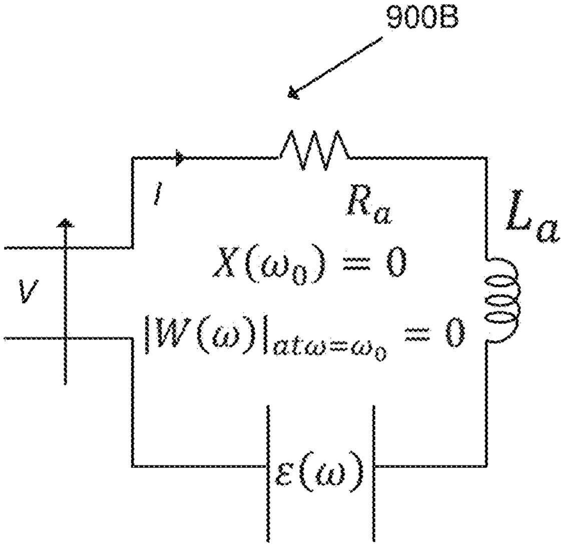

In another embodiment, as shown in the circuit 900B of FIG. 9B, the total Q energy in the system is nullified instead of only nullifying the Q energy of the tuning capacitor: $|\omega(\omega_0)|=0$ at $\omega=\omega_0$. This requirement can be satisfied at the resonance frequency if $\gamma=\omega_p$ and $$C_0 = \frac{1}{L_a(\omega_0^2+\omega_p^2)}$$

Figure 9C:
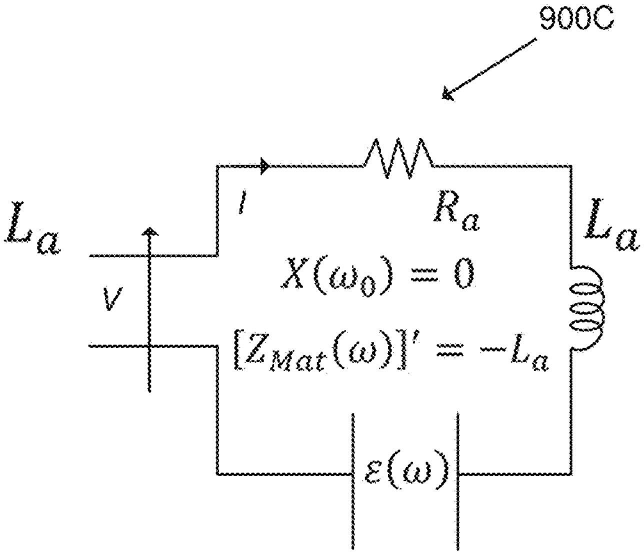
Figure 10A:
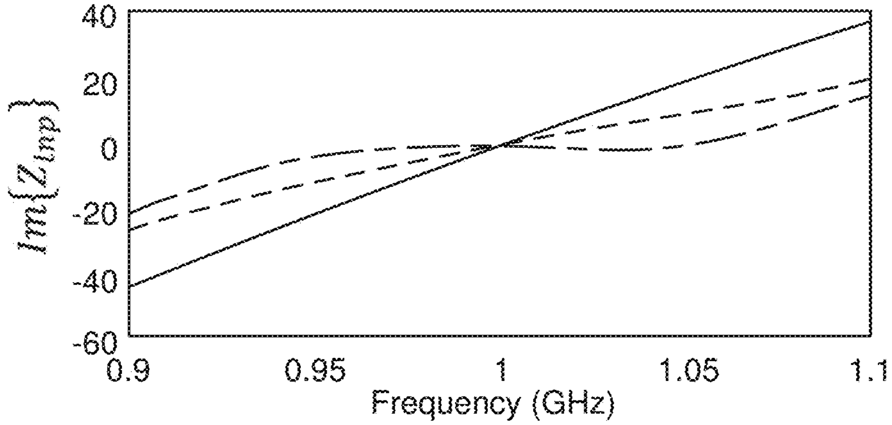
FIGS. 10A-10E are graphs that compare results for different matching loads of the circuits of FIGS. 9A-9C.
Figure 10B:
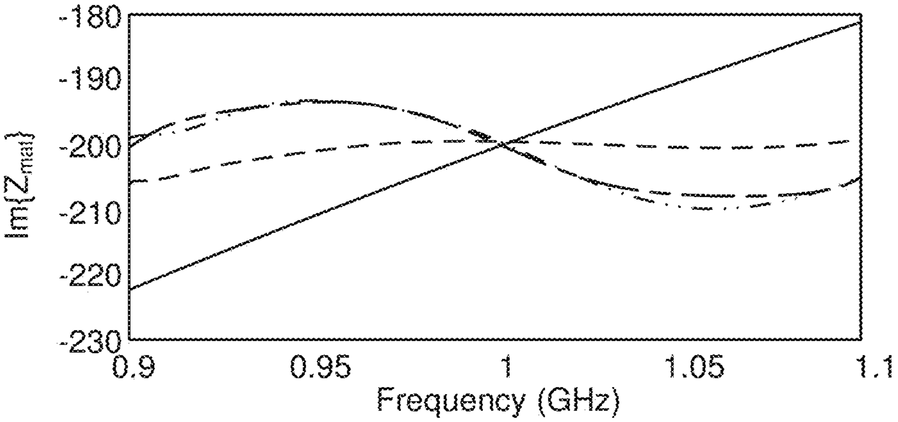
Figure 10C:
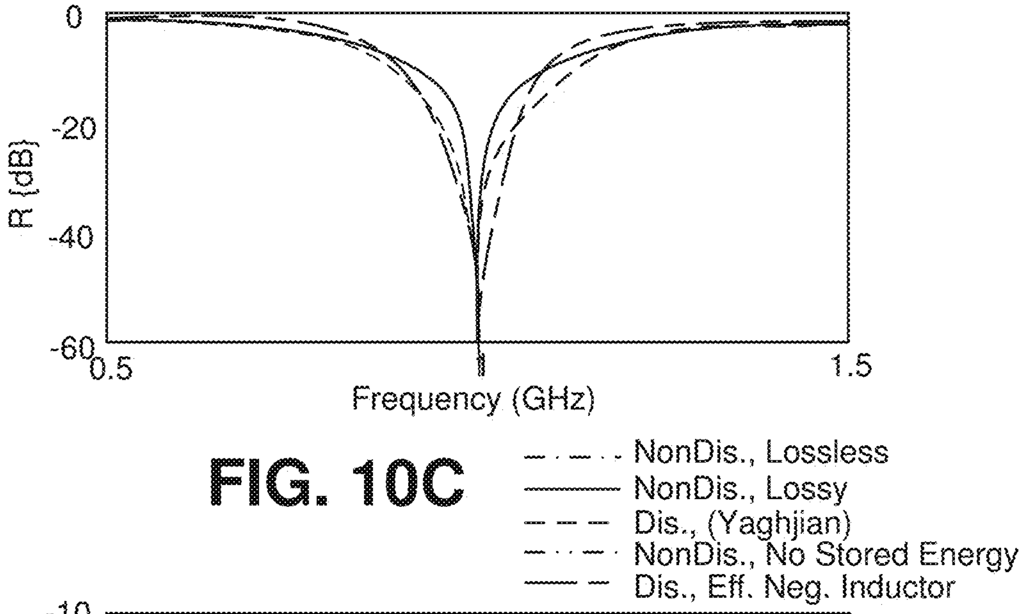
Figure 10D:
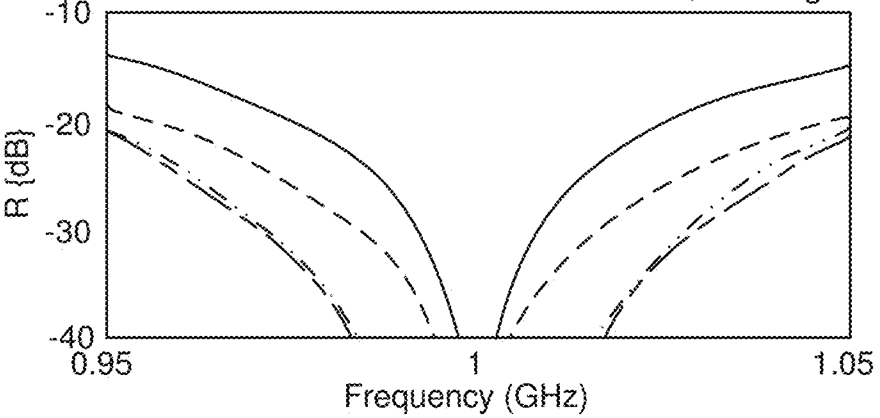
Figure 10E:
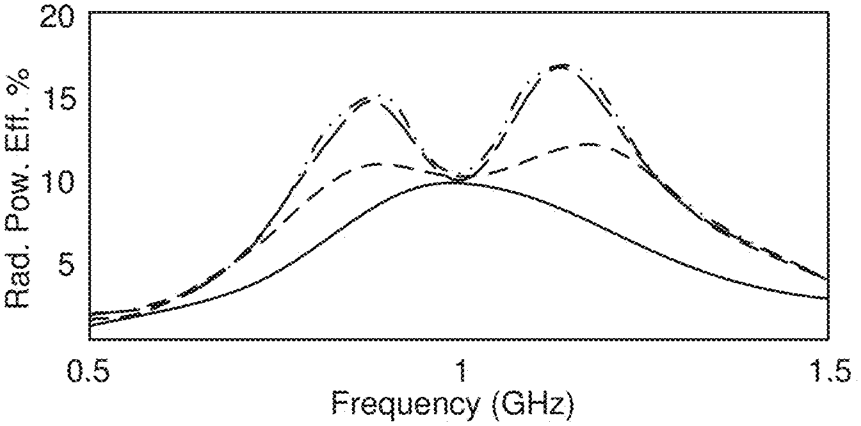

FIGS. 9B-9C and 10A-10E compare the results for these different approaches, namely, nullifying the total stored energy around the design frequency at the tuning capacitor, and nullifying the total Q energy of the system. Further comparison is made to the circuit 900A in FIG. 9A, which illustrates the dispersion of material inside a capacitor to nullify its contribution to the Q energy according to $[\omega\varepsilon(\omega)]'=0$ at $\omega=\omega_0$ at the resonance frequency. As shown, the approaches shown in FIGS. 9B and 9C provide an even larger bandwidth enhancement compared to the original approach proposed by Yaghjian, e.g., shown in FIG. 9A. The conditions to double the bandwidth, realizing the concept introduced in Yaghjian are $\gamma=\sqrt{2}\omega_p$ and $$L_0 = \frac{1}{C_a\omega_0^2}.$$

The bandwidth can be further extended by nullifying the Q energy of the whole system, for which the required conditions are $\gamma=\omega_p$, and $$L_0 = \frac{1}{C_a\omega_0^2}.$$

These parameters can be directly implemented in the circuits of FIGS. 5-8, respectively.

The required values for the lumped elements in the equivalent circuits of FIGS. 5-8 for the tuning element may become non practical in view of electrically small antenna, since the elements are very dispersive. This issue can be resolved by using suitably designed circuit transformations like those introduced by Zobel (Zobel, O. J., Theory and Design of Uniform and Composite Electric Wave Filters, Bell System Technical Journal, Vol. 2 (1923), pp. 1-46), the entirety of which is incorporated by reference herein.

Figure 11:
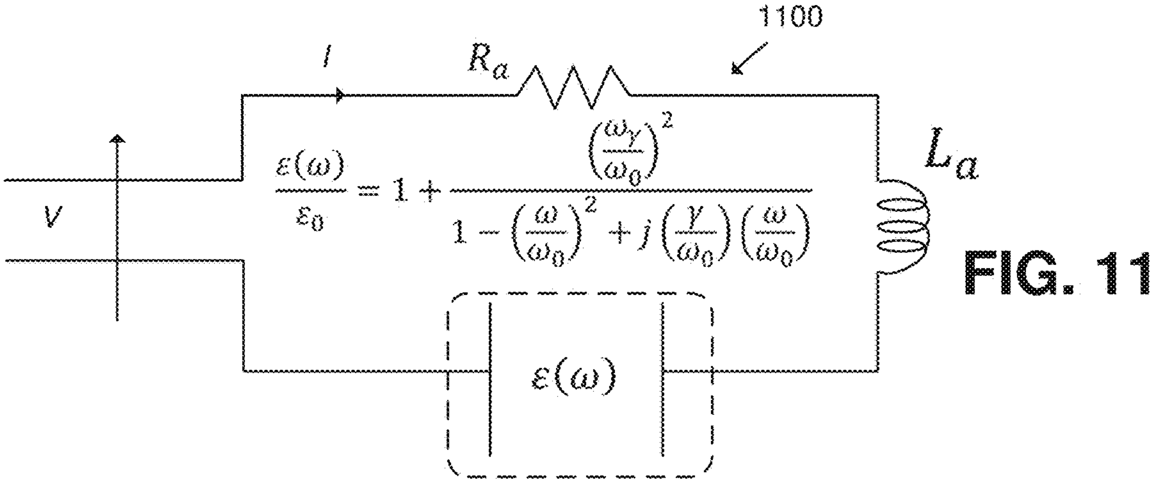
FIGS. 11-13 are diagrams of a circuit, in accordance with other embodiments of the present inventive concept.
Figure 12:
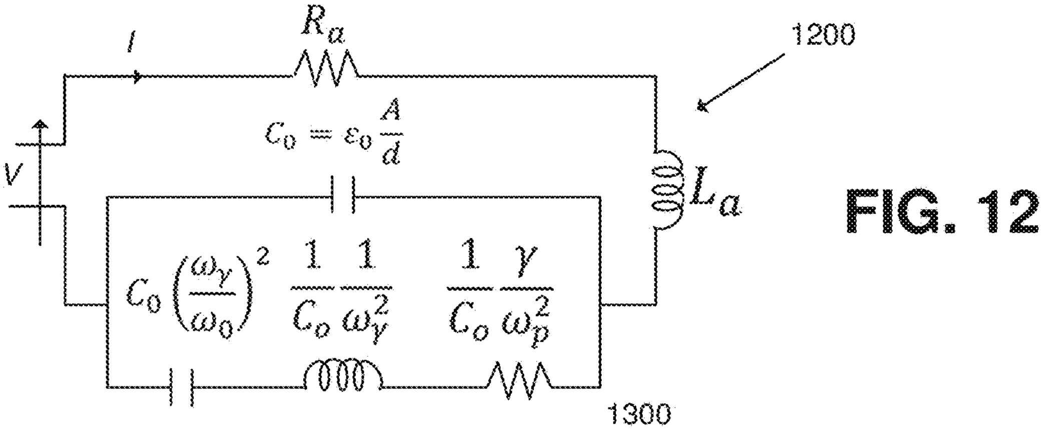
Figure 13:
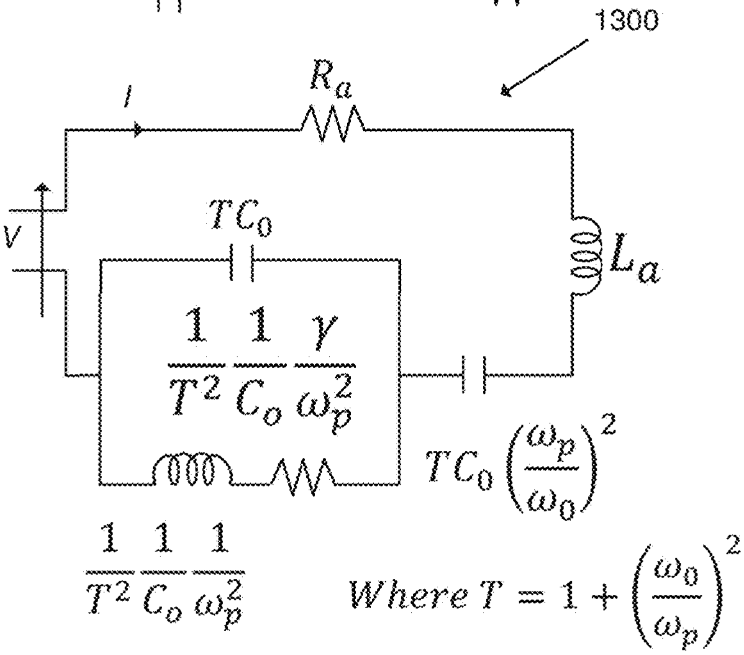

FIGS. 11-13 outline a transformed circuit that implements the case of an electrically small inductive antenna tuned by a capacitor filled with a highly dispersive dielectric. The circuit model 1100 of FIG. 11 may be similar to the circuit model 500 of FIG. 5, and the circuit model 1200 of FIG. 12 may be similar to the circuit model 700 of FIG. 7. In particular, the Zobel transformation above can be applied to achieve practical values for the lumped elements in the circuit realization of the capacitor filled with highly dispersive material. Note that in the circuit realization illustrated in FIGS. 11-13, the capacitor values have been increased by a factor of T and the inductor values have been decreased by a factor of $T^2$.

Figure 14:
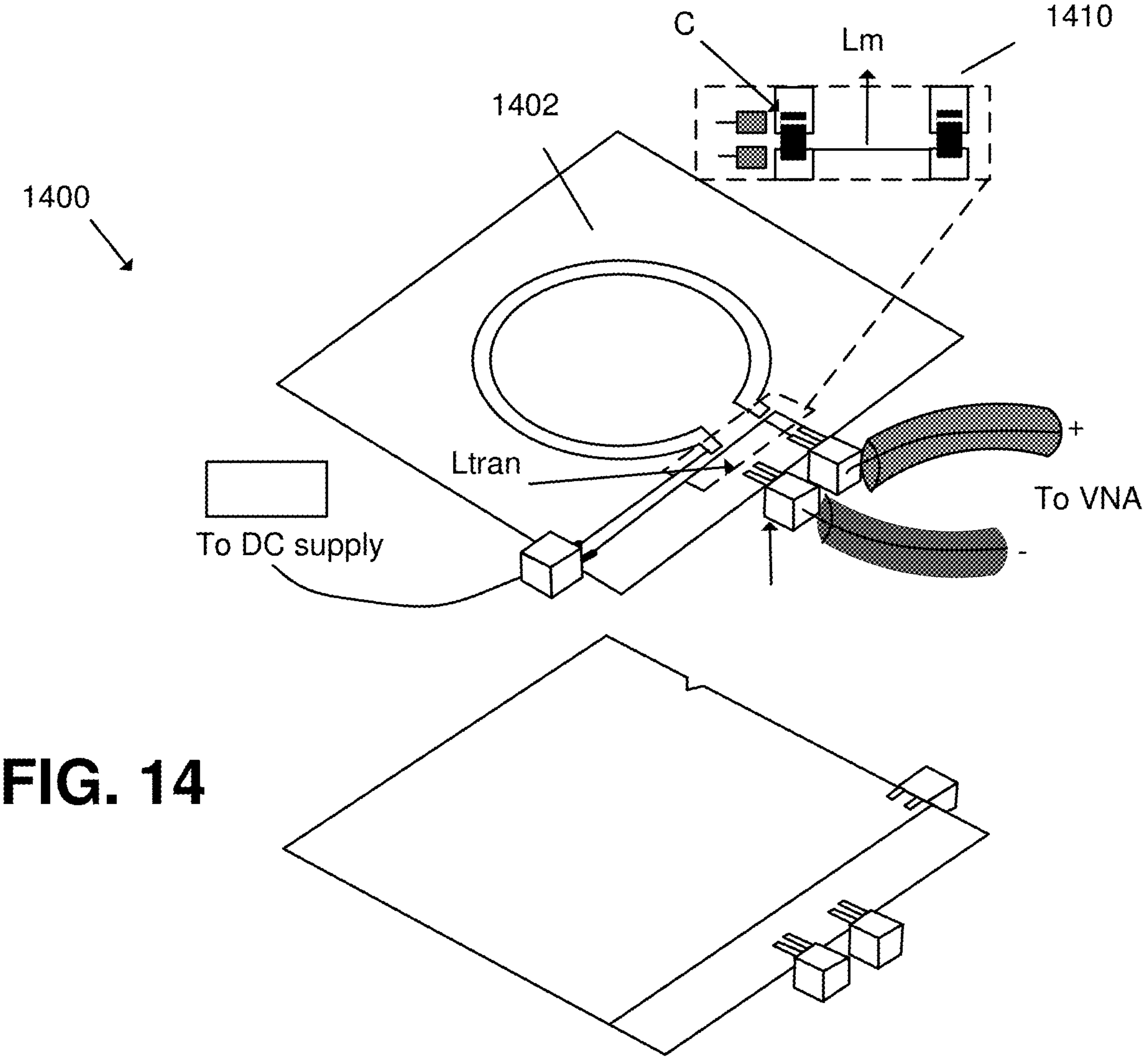
FIG. 14 is an exploded perspective view of an electrically small loop antenna, in accordance with some embodiments of the present inventive concept.
Figure 15:
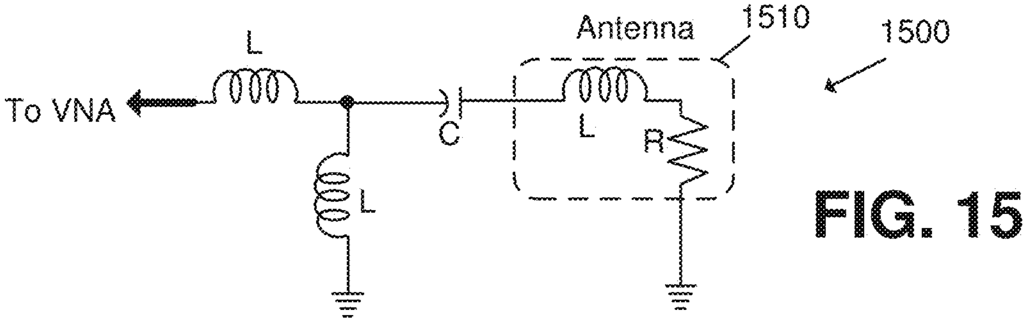
FIG. 15 is an equivalent circuit model of the electrically small loop antenna of FIG. 14.

In some embodiments, as described above, a circuit can include a parallel RLC tank in series with C to implement dispersive capacitor or in series with L to implement dispersive inductor. Since it is practically easier to design a matching network for an inductive antenna, e.g., because of an additional tunability degree of freedom offered in networks with more capacitors through varactor diodes, some embodiments can include a loop antenna with an inductive response, for example, shown in FIGS. 14 and 15. In particular, FIG. 14 is an exploded perspective view of an electrically small loop antenna 1400, in accordance with some embodiments. FIG. 15 is an equivalent circuit model 1500 of the electrically small loop antenna of FIG. 14. The antenna system 1400 can be derived from circuit models described with respect to those illustrated in FIGS. 5-13, but not limited thereto.

The antenna system 1400 shown in FIG. 14 may be 107 mm×120 mm, for example. The antenna may have a radius of 35 mm formed by two ends separated from each other by 13 mm, for example. The dashed box 1510 in FIG. 15 shows the equivalent impedance of the antenna system 1400 composed of a serially-connected inductor L and resistor R. In particular, the values C, Lm, Ltran can be mapped to their corresponding components shown in FIG. 14. Through the frequency range of interest spanning 220 MHz to 300 MHz, the electrical size of this antenna 1400 is 0.32 to 0.44 smaller than $\pi/2$ confirming it's an electrically small size antenna with infinitesimal radiation resistance, for example, described in J. S. McLean, "A re-examination of the fundamental limits on the radiation Q of electrically small antennas," *IEEE Trans. Antennas Propag.*, vol. 44, no. 5, p. 672, 1996-1996, doi: 10.1109/8.496253, the entirety of which is incorporated by reference herein.

Figure 16:
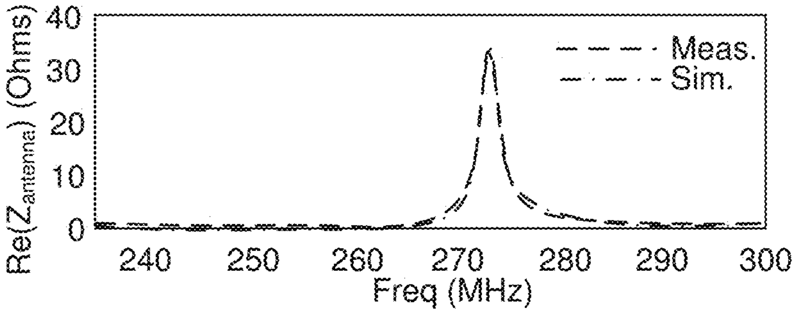
FIGS. 16 and 17 are graphs illustrating measured and computed real and imaginary parts of an antenna input impedance produced from a simulation and measurement performed by the antenna system and model of FIGS. 14 and 15.
Figure 17:
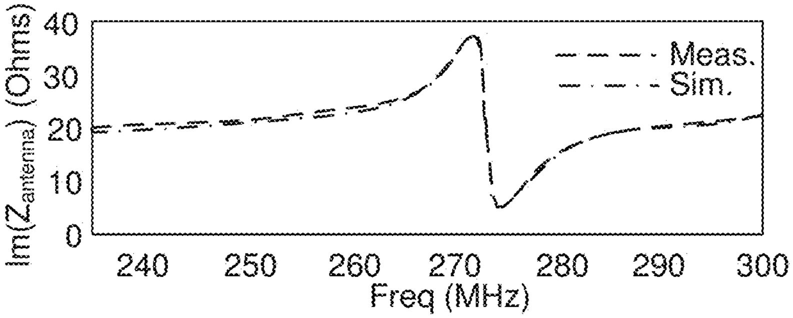

To characterize the antenna impedance, the simulation model, measurement data, or a combination or both are relied upon. However, since the antenna 1402 is electrically small its radiation resistance is very small that can be in order of milliohms which makes it difficult to measure in uncontrolled environment. Additionally, simulation models are not the always correct specially for high Q systems. Therefore, we depend on both simulation and measurement. First to overcome the measurement issue, an L matching network 1410 is attached to the antenna 1402 composed of series capacitor, C, implemented through a varactor diode and a shunt inductor, Lm, implemented using thin PCB microstrip or the like. The role of the L matching network 1410 is to transform the small resistance to higher resistance close to 50 Ohms (the system impedance) and thus the radiation resistance can be estimated more accurately. Second, as shown in FIG. 15, the equivalent circuit model 1510 is developed in addition to the matching network. Finally, the real and imaginary part of the input impedance are measured and computed, as shown in FIGS. 16 and 17, respectively, where the measurement and simulation data show excellent agreement. For example, simulation results generated by the antenna of FIGS. 14 and 15 can characterize the antenna input examples as (L, R)=82 nH, 1.4Ω, for example, shown in A. Mekawy, H. Li, Y. Radi, and A. Alh, "Parametric Enhancement of Radiation from Electrically Small Antennas," *Physical Review Applied*, vol. 15, no. 5, p. 054063, 05/27/2021, doi: 10.1103/PhysRevApplied.15.054063, the entirety of which is incorporated by reference herein.

Figure 18:
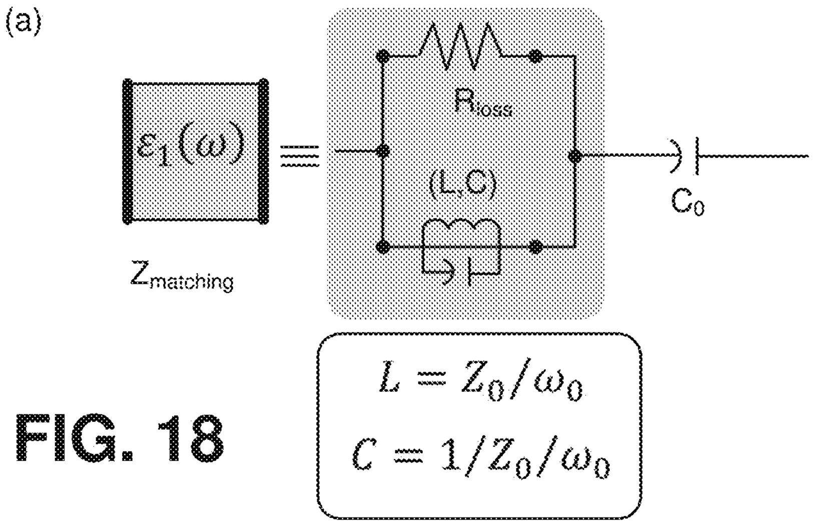
FIG. 18 is a diagram of a circuit including a dispersive capacitor using lumped components with finite quality factors (Q), in accordance with some embodiments of the present inventive concept.
Figure 19A:
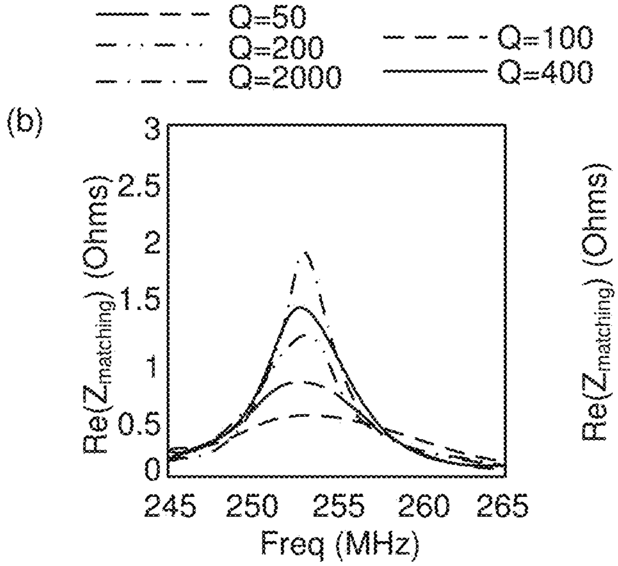
FIGS. 19A and B are graphs illustrating an impedance, Zmatching, real and imaginary parts for different Q factors of the circuit of FIG. 18.

In accordance with some embodiments of the present inventive concept, an electronic circuit element such as a dispersive capacitor in series with the antenna can be added to realize evaluation point (EP) matching that nullifies the Q energy. For example, in an experiment, the matching occurs at a resonance frequency, $f_0=\omega_0/2/\pi=253$ MHz at which the antenna electrical size is $0.37<\pi/2$. An ideal implementation of the matching network is shown in FIG. 18 which realizes an equivalent negative inductance at the target resonance frequency $f_0$ and equivalent loss $R_{loss}=2$ Ohms=1.4R. The simulation results for the real and imaginary part of the matching impedance are shown in FIGS. 19A and B for different values of the same quality factor assumed for all the components, Q. As shown in FIGS. 19A and B, the components quality factor Q is a key parameter in the ability to realize effective negative inductance, where the effective negative inductance disappears as Q is decreased. For instance, practical values of Q=50 show that we not only are able to get the effective negative inductance, but also the value of the loss significantly changes. Therefore, practical implementation of the dispersive capacitor for very small loss cannot be realized using lumped components.

Figure 19B:
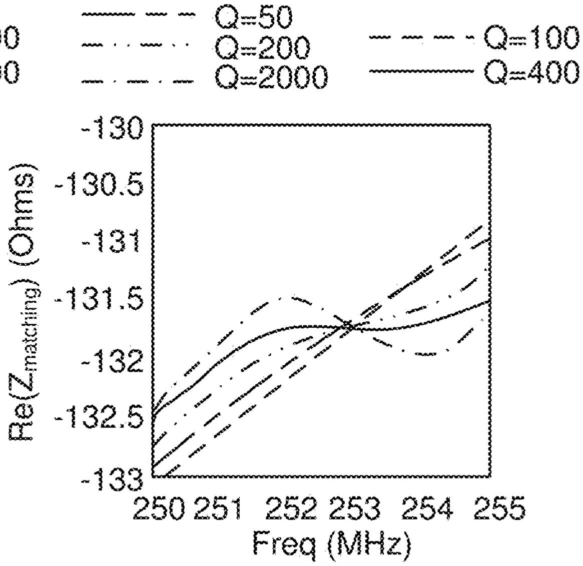

In some embodiments, another approach can be provided to realize the dispersive matching is to eliminate without the need for the loss resistor, $R_{loss}$ but rather depends on the inevitable loss associated with the lumped components due their limited Q to provide the desired loss value. To do so, a coupled ring waveguide resonator (CRW) or the like is positioned on a FR4 PCB board or the like along with its layout as shown in FIG. 20. In this design, the system gets the required loss in form of distributed loss from the finite tan δ of the substrate and the metallic losses of the traces, and the effective negative inductance can be controlled by choosing the gap g dimension. In addition, due to the finite coupling length between the waveguide and the ring, the equivalent circuit model for the CRW is not simply a series impedance that matches the dispersive capacitor impedance. However, the value of the series impedances in the circuit model has the required values of the dispersive matching capacitor. To show this, different PCB boards can be provided with different gap sizes, g and the real and imaginary part of the series impedance of the network is shown in FIG. 21A on the y axis, compared to the required impedance from simulation on the y axis shown in FIG. 21B. As shown, Z parameters of the matching network are shown from measurements for different gap g values on the y axis of FIG. 21A and for the equivalent circuit model for g=10 mm on the y axis of FIG. 21B. Here, the gap value of 1 mm matches the expectation, and this board will be used in series with the antenna to provide the EP matching. It is clear that using this approach the system can get very small loss value, with effective negative inductance. Compared to the matching capacitor results in FIGS. 19A and 19B, a deviation is present between the lumped component results and the PCB results due to the additional length of transmission line in the waveguide, additionally, the shunt impedance, $Z_{12}$ and the left series impedance $Z_{11}$-$Z_{12}$ in FIG. 17 are not part of the dispersive matching capacitor. However, their effect does not change the conclusions of the foregoing approach.

Figure 22A:
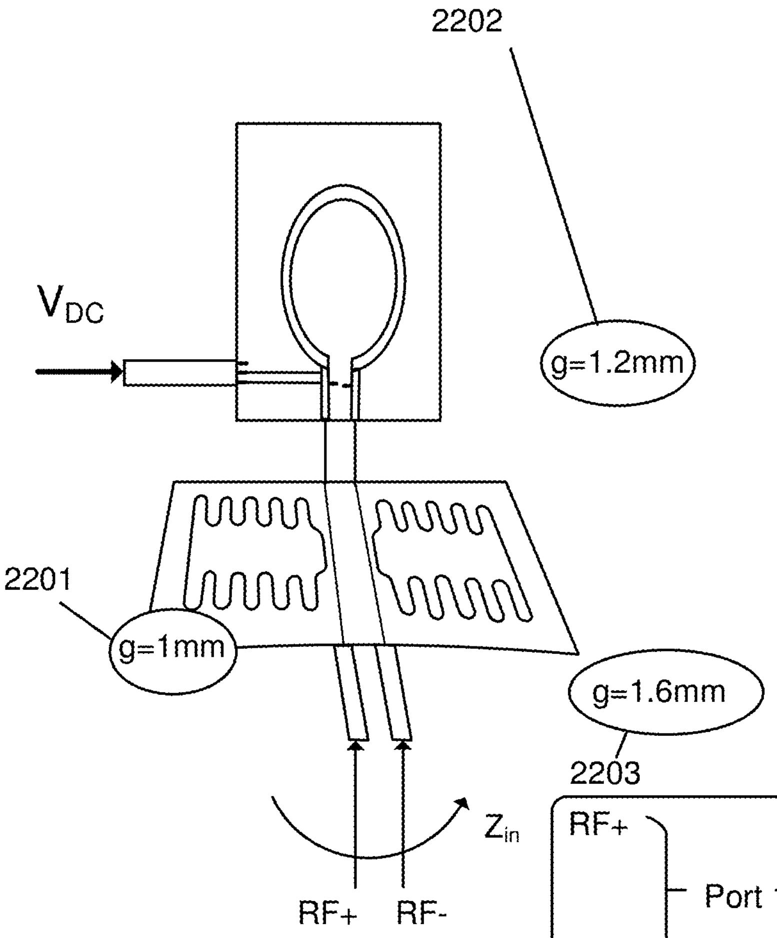
FIGS. 22A and 22B are views of an experimental setup with integrated antenna and matching network according to some embodiments of the present inventive concept.
Figure 22B:
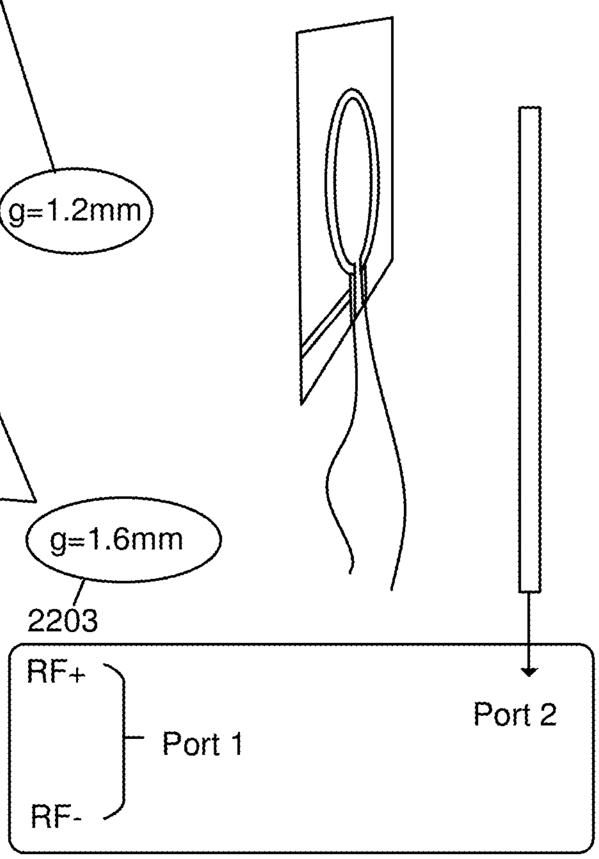
Figure 23A:
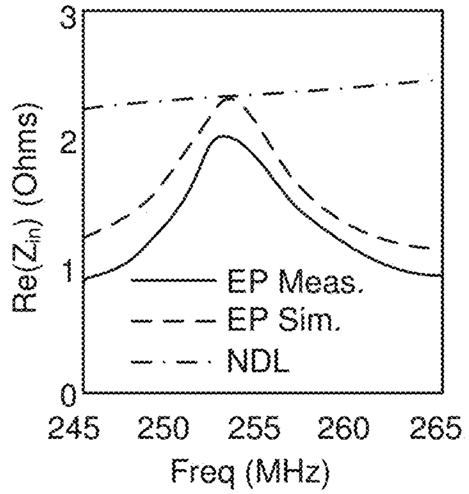
FIGS. 23A and 23B are graphs illustrating real and imaginary parts of the input impedance of the integrated antenna with the matching network of FIGS. 22A and 22B for different matching approaches.
Figure 23C:
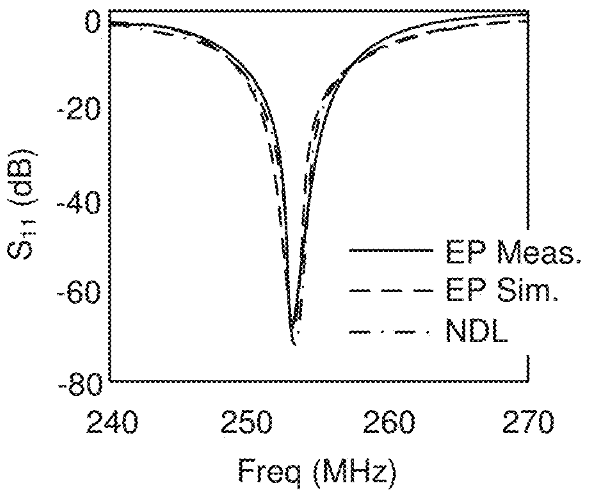
FIG. 23C is a graph illustrating the reflection parameter for the different matching approaches.
Figure 23B:
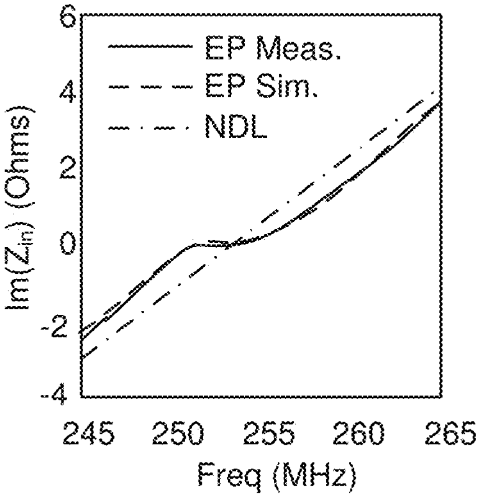
Figure 23D:
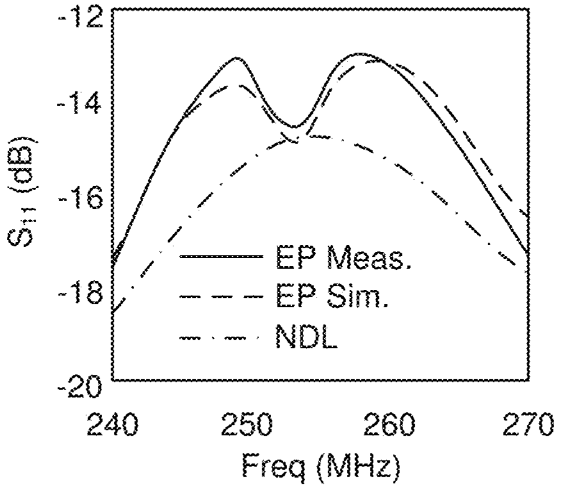
FIG. 23D is a graph illustrating the normalized radiation for different matching approaches.

The antenna can be connected with the fabricated matched capacitor as shown in FIG. 22A. FIG. 22B shows the measurement setup for normalized radiation measurement. In FIG. 22A, the circles 2201-2203 show the gap values for different fabricated PCB boards. This integrated antenna resembles the EP matching approach, for which the measured real and imaginary part of the input impedance is shown in FIGS. 23A and B, respectively, confirming that the derivative of the imaginary part is 0 at $f_0$=253 MHz, the main characteristic of the EP matching. Additionally, the same parasitic of the fabricated antenna used and is performed full wave simulation for NDL matching approach and for the EP approach. The real part and the imaginary part of these approaches are superimposed to the measured $Z_{in}$ of the EP approach in FIGS. 23A and B, respectively. As shown, generally agreement is observed between the simulated EP and measured EP approach. In fact, there is an identical match in the imaginary part of the input impedance, but the real parts of the input impedances are slightly deviated. The reason for excellent agreement between the simulation and measured imaginary part of the input impedance is that the reference of the imaginary part that should be 0, and can be tuned in the measurement by adjusting the DC bias for the varactor diodes and equivalently changing the value of $C_0$ (see DC ports in FIG. 22A required for changing the value of $C_0$). We also measured the reflection and the normalized radiation from the integrated antenna as shown in FIGS. 23C and D, respectively, matching the analysis expectations from the previous section. In particular, the two peaks in radiation in case of EP, and wider bandwidth compared to NDL. The normalized radiation is $S_{21}$ where Ports 1 and 2 are defined in the experimental setup shown in FIGS. 22A and 22B. Although the inventive concept shown and described in this disclosure recites various embodiments of a small antenna, the present inventive concept can be readily translated to different disciplines that may or may not include an antenna, including but not limited to acoustics, e.g., enhancing the bandwidth of sub-wavelength acoustic transducers.

While the invention has been described with reference to certain embodiments, it will be understood by those skilled in the art that various changes may be made, and equivalents may be substituted for elements thereof to adapt to particular situations without departing from the scope of the disclosure. Therefore, it is intended that the claims are not limited to the particular embodiments disclosed, but that the claims will include all embodiments falling within the scope and spirit of the appended claims.

What is claimed is:

1. An apparatus, comprising:

an antenna; and a matching circuit comprising a plurality of lumped circuit elements configured to emulate a dispersive material by mapping dispersion properties of the dispersive material into corresponding circuit elements of the plurality of lumped circuit elements, the matching circuit configured to tune the antenna by providing a frequency-dependent dispersive response that reduces stored reactive energy of the antenna, thereby modifying a bandwidth of the antenna.

2. The apparatus of claim 1, wherein the matching circuit includes an impedance transformer for nullifying at least a portion of the stored energy of at least one electronic circuit element of the plurality of lumped circuit elements.

3. The apparatus of claim 1, wherein the antenna is an electrically small inductive antenna.

4. The apparatus of claim 1, wherein the antenna is an electrically small capacitive antenna.

5. The apparatus of claim 1, wherein the dispersive material is determined as a sum of Lorentzian functions for realizing an arbitrary frequency dispersion in a matching load of the antenna.

6. The apparatus of claim 5, wherein the arbitrary frequency dispersion is fitted into the sum of Lorentzian functions of the form including:

$$\sum_n \frac{\left(\frac{\omega_{pn}}{\omega_{0n}}\right)^2}{1-\left(\frac{\omega}{\omega_{0n}}\right)^2+j\left(\frac{\gamma_n}{\omega_{0n}}\right)\left(\frac{\omega}{\omega_{0n}}\right)},$$

wherein, for each Lorentzian term in the sum, a corresponding circuit load is implemented by the matching circuit, and wherein each of the plurality of lumped circuit elements follows parameters $\omega_{pn}$, $\omega_{0n}$, $\gamma_n$ of the corresponding Lorentzian function.

7. The apparatus of claim 1, wherein the dispersive material is constructed so that at least one electronic circuit element of the plurality of lumped circuit elements operates as a negative inductor around a resonance frequency at which a matching operation of the matching circuit occurs.

8. The apparatus of claim 1, wherein the dispersive material is constructed to nullify a source of stored energy at the plurality of lumped circuit elements around a frequency of the dispersive material.

9. The apparatus of claim 1, wherein the dispersive material is constructed to nullify a source of Q energy in the apparatus.

10. The apparatus of claim 1, wherein the plurality of lumped circuit elements comprises a parallel RLC tank in series with a capacitor, the parallel RLC tank having component values configured to follow Lorentzian dispersion parameters to emulate a dispersive dielectric material.

11. The apparatus of claim 1, wherein the plurality of lumped circuit elements comprises a parallel RLC tank in series with an inductor, the parallel RLC tank having component values configured to follow Lorentzian dispersion parameters to emulate a dispersive magnetic material.

12. A method of realizing an arbitrary frequency dispersion in a matching load of an antenna by implementing a corresponding circuit configuration comprising a plurality of lumped circuit elements configured to emulate a dispersive material by mapping dispersion properties of the dispersive material into corresponding circuit elements of the plurality of lumped circuit elements, the circuit configuration configured to tune the antenna by providing a frequency-dependent dispersive response that reduces stored reactive energy of the antenna, the method comprising:

fitting the frequency dispersion into a sum of Lorentzian functions of the form $$\sum_n \frac{\left(\frac{\omega_{pn}}{\omega_{0n}}\right)^2}{1-\left(\frac{\omega}{\omega_{0n}}\right)^2+j\left(\frac{\gamma_n}{\omega_{0n}}\right)\left(\frac{\omega}{\omega_{0n}}\right)};$$

and implementing for each Lorentzian term in the sum a corresponding circuit load, in which each circuit element follows the parameters of corresponding Lorentzian resonant frequency and dispersion parameters $\omega_{pn}$, $\omega_{0n}$, $\gamma_n$.

13. The method of claim 12, wherein the matching circuit includes an impedance transformer for nullifying at least a portion of the stored energy of at least one electronic circuit element of the plurality of lumped circuit elements.

14. The method of claim 12, wherein the antenna is an electrically small inductive antenna.

15. The method of claim 12, wherein the antenna is an electrically small capacitive antenna.

16. The method of claim 12, wherein the dispersive material is determined as a sum of Lorentzian functions for realizing an arbitrary frequency dispersion in the matching load of the antenna.

17. An apparatus comprising:

an antenna; and a system comprising a plurality of lumped circuit elements configured to emulate a dispersive material by mapping dispersion properties of the dispersive material into corresponding circuit elements of the plurality of lumped circuit elements, the system configured to tune the antenna by providing a frequency-dependent dispersive response that reduces stored reactive energy of the antenna according to a method comprising:

fitting a frequency dispersion into a sum of Lorentzian functions of the form $$\sum_n \frac{\left(\frac{\omega_{pn}}{\omega_{0n}}\right)^2}{1-\left(\frac{\omega}{\omega_{0n}}\right)^2+j\left(\frac{\gamma_n}{\omega_{0n}}\right)\left(\frac{\omega}{\omega_{0n}}\right)};$$

and implementing for each Lorentzian term in the sum a corresponding circuit load, in which each circuit element follows the parameters of corresponding Lorentzian resonant frequency and dispersion parameters $\omega_{pn}$, $\omega_{0n}$, $\gamma_n$.

18. The apparatus of claim 17, wherein the system includes matching circuit elements including an impedance transformer for nullifying at least a portion of the stored energy of at least one electronic circuit element of the plurality of lumped circuit elements.

19. The apparatus of claim 17, wherein the antenna is an electrically small inductive antenna.

20. The apparatus of claim 17, wherein the antenna is an electrically small capacitive antenna.

* * * * *